United States Patent
Aboshi

(10) Patent No.: US 9,057,914 B2
(45) Date of Patent: Jun. 16, 2015

(54) DISTRIBUTION-TYPE COMPENSATOR AND PROJECTION-TYPE LIQUID CRYSTAL DISPLAY APPARATUS

(71) Applicant: JVC KENWOOD CORPORATION, Yokohama-shi, Kanagawa (JP)

(72) Inventor: Kazutaka Aboshi, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 113 days.

(21) Appl. No.: 13/866,564

(22) Filed: Apr. 19, 2013

(65) Prior Publication Data
US 2013/0229604 A1    Sep. 5, 2013

Related U.S. Application Data

(63) Continuation of application No. PCT/JP2011/072442, filed on Sep. 29, 2011.

(30) Foreign Application Priority Data

Oct. 20, 2010    (JP) .................................. 2010-235726

(51) Int. Cl.
*G02F 1/1335*    (2006.01)
*G02F 1/13363*    (2006.01)
(Continued)

(52) U.S. Cl.
CPC .......... *G02F 1/13363* (2013.01); *G02B 5/3083* (2013.01); *G02F 2001/133548* (2013.01);
(Continued)

(58) Field of Classification Search
CPC . H04N 9/3105; H04N 9/3197; H04N 5/7441; H04N 9/3167; G02F 1/133526; G02F 1/13363; G02F 1/133634; G02B 27/283; G02B 5/3083

USPC ................................................. 349/117, 5, 9
See application file for complete search history.

(56) References Cited

U.S. PATENT DOCUMENTS 5,182,665 A  *  1/1993  O'Callaghan et al. ........ 349/201
5,576,854 A  *  11/1996  Schmidt et al. .................... 349/5
(Continued)

FOREIGN PATENT DOCUMENTS

EP     2166772 A2    3/2010
JP     10-153707 A    6/1998
(Continued)

OTHER PUBLICATIONS

Shahzad, K. and Shimizu, J. A. (2006), "Contrast behavior of a field lens with a wire-grid PBS". Journal of the Society for Information Display, 14: 293-301.*

(Continued)

*Primary Examiner* — Mike Qi
(74) *Attorney, Agent, or Firm* — Nath, Goldberg & Meyer; Jerald L. Meyer; Tiffany A. Johnson

(57) ABSTRACT

A distribution-type compensator has an in-plane retardation of 18 nm±5 nm in a rectangular effective region with a long side and a short side. The slow axis direction of the distribution-type compensator changes continuously in a plane of the effective region and an angle difference between slow axis directions at any two positions in the effective region has a maximum value in a range of 10 degrees to 30 degrees. The distribution-type compensator is mounted to a projection-type display apparatus.

3 Claims, 8 Drawing Sheets

(51) Int. Cl.
  *G02B 5/30* (2006.01)
  *G03B 21/00* (2006.01)
  *G03B 33/12* (2006.01)
  *H04N 9/31* (2006.01)
  *G03B 21/20* (2006.01)
  *G02F 1/1362* (2006.01)

(52) U.S. Cl.
  CPC .. *G02F2001/133631* (2013.01); *G03B 21/006* (2013.01); *G03B 33/12* (2013.01); *H04N 9/3167* (2013.01); *G02F 2001/136281* (2013.01); *G02F 2202/40* (2013.01); *G02F 2413/09* (2013.01); *G02F 2413/11* (2013.01); *G03B 21/2073* (2013.01)

(56) References Cited

U.S. PATENT DOCUMENTS

| | | | |
|---|---|---|---|
| 5,973,759 A * | 10/1999 | Itoh et al. | 349/5 |
| 6,190,013 B1 * | 2/2001 | Tani et al. | 353/31 |
| 6,368,760 B1 | 4/2002 | Nishiguchi | |
| 6,781,640 B1 * | 8/2004 | Huang | 349/5 |
| 6,806,930 B2 * | 10/2004 | Moia | 349/117 |
| 2004/0114079 A1 * | 6/2004 | Kurtz et al. | 349/117 |
| 2004/0179158 A1 * | 9/2004 | Silverstein et al. | 349/117 |
| 2005/0128392 A1 * | 6/2005 | Kurtz et al. | 349/117 |
| 2009/0310041 A1 * | 12/2009 | Suzuki et al. | 349/5 |

FOREIGN PATENT DOCUMENTS

| | | |
|---|---|---|
| JP | 10-160933 A | 6/1998 |
| JP | 2005-221761 A | 8/2005 |
| JP | 2007-101764 A | 4/2007 |
| JP | 2007-212997 A | 8/2007 |
| JP | 2009-300709 A | 12/2009 |
| WO | 99/53349 A1 | 10/1999 |

OTHER PUBLICATIONS

Seiberle, H., Benecke, C. and Bachels, T. (2004), "Photo-aligned anisotropic optical thin films". Journal of the Society for Information Display, 12: 87-92.*

European Patent Application No. 11834176.7, Search Report dated Mar. 21, 2014, five (5) pages.

* cited by examiner

| PROJECTION SCREEN POSITION | PRINCIPAL LIGHT RAY ANGLE ($\theta x$, $\theta y$) (DEGREE) | | MAXIMUM POLAR ANGLE (DEGREE) |
|---|---|---|---|
| | CENTER $\theta x$ | CENTER $\theta y$ | |
| 1 | −5 | 7 | 13 |
| 2 | 0 | 7 | 13 |
| 3 | 5 | 7 | 13 |
| 4 | −5 | 0 | 13 |
| 5 | 0 | 0 | 13 |
| 6 | 5 | 0 | 13 |
| 7 | −5 | −7 | 13 |
| 8 | 0 | −7 | 13 |
| 9 | 5 | −7 | 13 |

FIG. 14

| | F-NUMBER | MAXIMUM PRINCIPAL LIGHT RAY ANGLE AT SCREEN POSITION (DEGREE) | MAXIMUM POLAR ANGLE (DEGREE) | LIQUID CRYSTAL ON SILICON | ELEMENT RETARDANCE CORRECTION (DEGREE) | OBLIQUE LIGHT CORRECTION COMPONENT (DEGREE) |
|---|---|---|---|---|---|---|
| FIRST EMBODIMENT | 2.0 | 5 | 14 | LIQUID CRYSTAL ON SILICON 12 | -3 | ±8 |
| | 2.0 | 5 | 14 | LIQUID CRYSTAL ON SILICON 120 | 0 | ±8 |
| SECOND EMBODIMENT | 1.5 | 20 | 20 | LIQUID CRYSTAL ON SILICON 12 | -3 | ±15 |
| | 1.5 | 20 | 20 | LIQUID CRYSTAL ON SILICON 120 | 0 | ±15 |
| THIRD EMBODIMENT | 3.5 | 3 | 8.2 | LIQUID CRYSTAL ON SILICON 12 | -3 | ±5 |
| | 3.5 | 3 | 8.2 | LIQUID CRYSTAL ON SILICON 120 | 0 | ±5 |

DISTRIBUTION-TYPE COMPENSATOR AND PROJECTION-TYPE LIQUID CRYSTAL DISPLAY APPARATUS

CROSS REFERENCE TO RELATED APPLICATION

This is a continuation application based on PCT application No. PCT/JP2011/072442 filed on Sep. 29, 2011, which claims the benefit of priority from Japanese Patent Application No. 2010-235726 filed on Oct. 20, 2010, the entire contents of which are incorporated by reference herein.

BACKGROUND

The present invention relates to a distribution-type compensator and a projection-type liquid crystal display apparatus using the same.

Recently, for a projection display apparatus such as a liquid crystal projector, a demand for downsizing and weight saving has intensified together with a demand for an improved performance. As a method of realizing downsizing and weight saving, there have been proposed a shift method from a three-plate system using three liquid crystal elements to a single-plate system using one liquid crystal element, a method of miniaturizing components with leaving the three-panel system, and the like.

As a method of realizing a downsized optical system for the liquid crystal projector, Patent Literature 1 (Japanese Patent Application Laid-Open Publication No. 2005-221761) discloses contents approximately as follows. In an optical system of a liquid crystal projector, a field lens is disposed between a liquid crystal on silicon and a wire-grid type polarization beam splitter hereinafter, called WG-PBS). Blue light, green light, and red light which have been separated from one another by a color separation optical system enter the WG-PBS at an incident angle smaller than 45 degrees. The light having passed through the WG-PBS enters the liquid crystal on silicon via the field lens. The light emitted from the liquid crystal on silicon enters the field lens again and enters the WG-PBS. By disposing the field lens between the reflection-type liquid crystal element and the WG-PBS, a light path of an illumination optical system before light enters the field lens and a light path of an imaging optical system after light has been reflected by the liquid crystal on silicon and passed through the field lens are configured in a non-telecentric manner, which causes a cross dichroic prism and the WG-PBS to be downsized.

In Patent Literature 1, by disposing the field lens between the reflection-type liquid crustal element and the WG-PBS, the light path of the illumination optical system before light enters the field lens and the light path of the imaging optical system after the light has been reflected by the liquid crystal on silicon and passed through the field lens are configured in the non-telecentric manner, which causes the cross dichroic prism and the WG-PBS to be downsized. Here, a telecentric optical system is an optical system in which an optical axis and a principal light ray are assumed to be parallel on one side of a lens.

As disclosed in Patent Literature 2 (Japanese Patent Application Laid-Open Publication No. 2007-101764) and Patent Literature 3 (Japanese Patent Application Laid-Open Publication No. 2007-212997), it has been performed conventionally to improve system contrast by disposing a plate-type compensator in the neighborhood of the liquid crystal on silicon in an optical system where the field lens is disposed in front of the WG-PBS (lamp side), without disposing the field lens between the liquid crystal on silicon and the WG-PBS. The conventional compensator has a birefringence characteristic which is uniform in a plate plane. On the other hand, in the case of the optical system where the field lens is disposed between the liquid crystal on silicon and the WG-PBS, the non-telecentric light ray enters into the WG-PBS and therefore it is not possible to optimize the contrast over the whole screen region by using the compensator having the birefringence characteristic which is uniform in the plane, and there has been a problem that an in-plane brightness difference is caused in a black output screen.

SUMMARY

The present invention has been achieved in view of such a problem and aims to provide a distribution-type compensator which can optimize contrast over the whole screen region in an optical system where a field lens is disposed between a reflection-type liquid crystal element and a WG-PBS, and to provide a projection-type liquid crystal display apparatus which mounts the same.

For solving the above-described conventional technical problem, according to a first aspect of an embodiment of the present invention, there is provided a distribution-type compensator provided to a liquid crystal display apparatus in which a field lens is disposed between a reflection-type liquid crystal element and a polarization beam splitter, the distribution-type compensator is disposed between the field lens and the reflection-type liquid crystal element wherein, a slow axis direction is changed so as to provide an oblique light correction component for a non-telecentric region, in-plane retardation is 18 nm±5 nm in a rectangular effective region with a long side and a short side, a slow axis direction changes discretely or continuously in a plane of the effective region, and an angle difference between slow axis directions at any two points in the effective region has a maximum value in a range of 10 degrees to 30 degrees.

Further, according to a second of the embodiment of the present invention, there is provided a liquid crystal display apparatus including: light source; an illumination optical system that illuminates a reflection-type liquid crystal element with light emitted from the light source; a polarization beam splitter that transmits polarized light of incident light and detects modulated light which has been modulated by the reflection-type liquid crystal element; a field lens that converts light from the polarization beam splitter into telecentric illumination light; the distribution-type compensator according to the first aspect; the reflection-type liquid crystal element that modulates light which has been transmitted through the distribution-type compensator; and a projection lens that projects modulated light from the reflection-type liquid crystal element.

According to the present invention, it is possible to optimize contrast over the whole region of a projector output screen using an optical system which disposes a field lens between a reflection-type liquid crystal element and a WG-PBS.

BRIEF DESCRIPTION OF THE DRAWINGS

FIG. 14 is a diagram showing parameters and characteristics of distribution-type compensators in the first, second, and third embodiments.

DETAILED DESCRIPTION

Hereinafter, embodiments of a projection-type display apparatus according to the present invention will be explained with reference to the attached drawings.

First Embodiment

Figure 1:
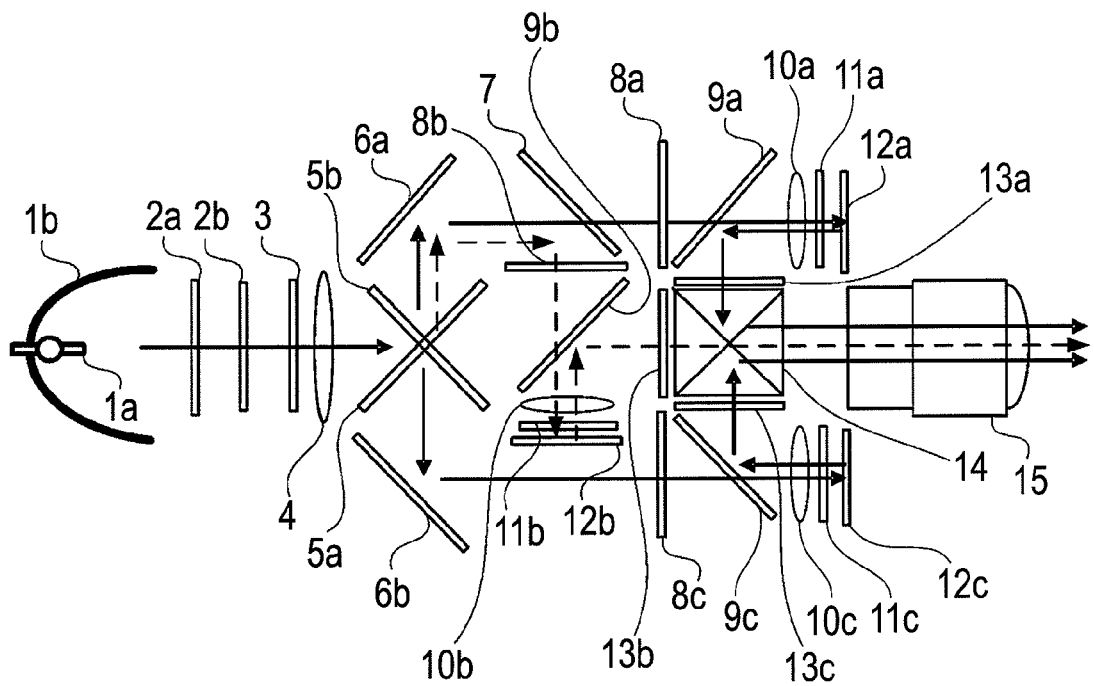
FIG. 1 is a configuration diagram of a projection-type display apparatus in a first embodiment of the present invention.

FIG. 1 is a configuration diagram of a projection-type display apparatus according to a first embodiment of the present invention. A light source 1a is an extra high pressure mercury lamp and emits white light. A reflector 1b reflects the light emitted from the light source. Light brightness distribution of the direct light from the light source and the reflected light reflected by the reflector is made uniform by a first integrator 2a and a second integrator 2b, and then light polarization directions thereof are arranged into one direction by a polarization converter 3. The arranged polarization is assumed to be P-polarization.

P-polarized light emitted from a polarization converter 3 is transmitted through a compound lens 4 and is separated into mixed light of red and green light and blue light by a Y dichroic mirror 5a and a B dichroic mirror 5b. The light path of the mixed light of red and green light and the light path of the blue light are bent by mirrors 6a and 6b. The mixed light of red and green light is separated into red light and green light by a G dichroic mirror 7 and the light path of the green light is bent. After having passed through polarizers 8a, 8b, and 8c, WG-PBSs 9a, 9b, and 9c, field lens 10a, 10b, and 10c, and distribution-type compensators 11a, 11b, and 11c, respectively, the red light, green light, and blue light traveling respective different light paths enter into a red liquid crystal on silicon 12a, a green liquid crystal on silicon 12b, and a blue liquid crystal on silicon 12c, respectively.

Each of the color liquid crystals on silicon 12a, 12b, and 12c modulates and reflects the incident light of each color. The modulated and reflected red light, and green light are transmitted again through the distribution-type compensators 11a 11b, and 11c, the field lenses 10a, 10b, and 10c, and then modulated S polarization components are reflected by the WG-PBSs 9a, 9b, and 9c. The S polarization components of the reflected red light, green light, and blue light are transmitted through analyzers 13a, 13b, and 13c, and then combined by a cross dichroic prism 14 and projected by a projection lens 15.

Figure 2:
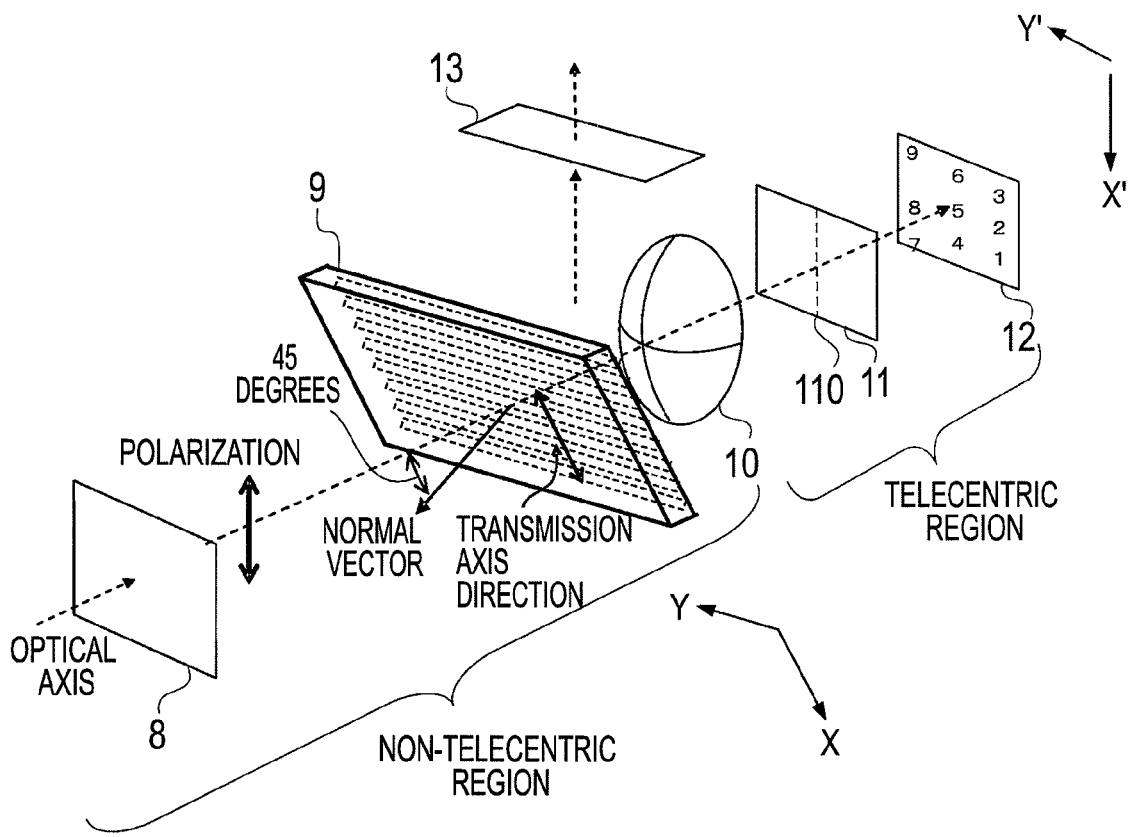
FIG. 2 is an explanatory diagram showing a light path from a polarizer 8 to an analyzer 13 via a WG-PBS 9, a field lens 10, a compensator 11, and a liquid crystal on silicon 12, in the projection-type display apparatus in the first embodiment.

FIG. 2 is an explanatory diagram showing a light path from the polarizer 8 to the analyzer 13 via the WG-PBS 9, the field lens 10, the distribution-type compensator 11, and the liquid crystal on silicon 12. The polarizer 8, the field lens 10, the distribution-type compensator 11, the liquid crystal on silicon 12, and the analyzer 13 are disposed perpendicularly to an optical axis. The polarizer 8 is a polarization plate, and improves a degree of polarization of the light which has been arranged into approximately linear polarization (P polarization) by the polarization converter 3 and also has a role of aligning a polarization direction of incident light with a transmission axis direction of the WG-PBS 9.

The WG-PBS 9 is a wire-grid type polarization beam splitter in which metal is formed in a grid shape on a glass substrate, and is provided to be inclined in 45 degrees with respect to the optical axis. That is, the angle of the normal vector of the WG-PBS 9 with respect to the optical axis is 45 degrees. The direction perpendicular to the direction of the wire grid is a transmission axis direction for transmitting polarized light. The WG-PBS 9 plays a role of a polarizer transmitting polarized light of the incident light and a role of analyzing modulated light which is modulated by the liquid crystal on silicon 12. The light which has been transmitted through the polarizer 8 and the WG-PBS 9 is transmitted through the field lens 10 and then enters the distribution-type compensator 11 and the liquid crystal on silicon 12. In FIG. 2, the liquid crystal on silicon 12 is provided with reference numerals 1 to 9. These reference numerals indicate positions of display regions in the liquid crystal on silicon 12. Reference numerals 1 to 4 and reference numerals 6 to 9 indicate points in the outermost perimeter of the display region in the liquid crystal on silicon 12.

The distribution-type compensator 11 compensates a polarization state of the light which will enter into or has been reflected by the liquid crystal on silicon 12. The distribution-type compensator 11 is disposed near the liquid crystal on silicon 12 which has the effective display region formed into a rectangular shape, and therefore an effective region of the distribution-type compensator 11 has a rectangular shape composed of a long side and a short side except four corners. In the following description, the distribution-type compensator 11 will be described as a compensator having a rectangular shape with a long side and a short side. Further, in the distribution-type compensator 11, a center line 110 is defined as follows for convenience in the following description. That is, among line segments on the plane of the distribution-type compensator 11, the center line 110 is a line segment which passes through a cross point with the optical axis and is included in or parallel to a plane made by the normal vector of the WG-PBS 9 and the optical axis. Further, the center line 110 is also defined as a line segment which passes through the cross point with the optical axis in the incident polarization axis direction among the line segments on the plane of the distribution-type compensator 11.

Figure 3:
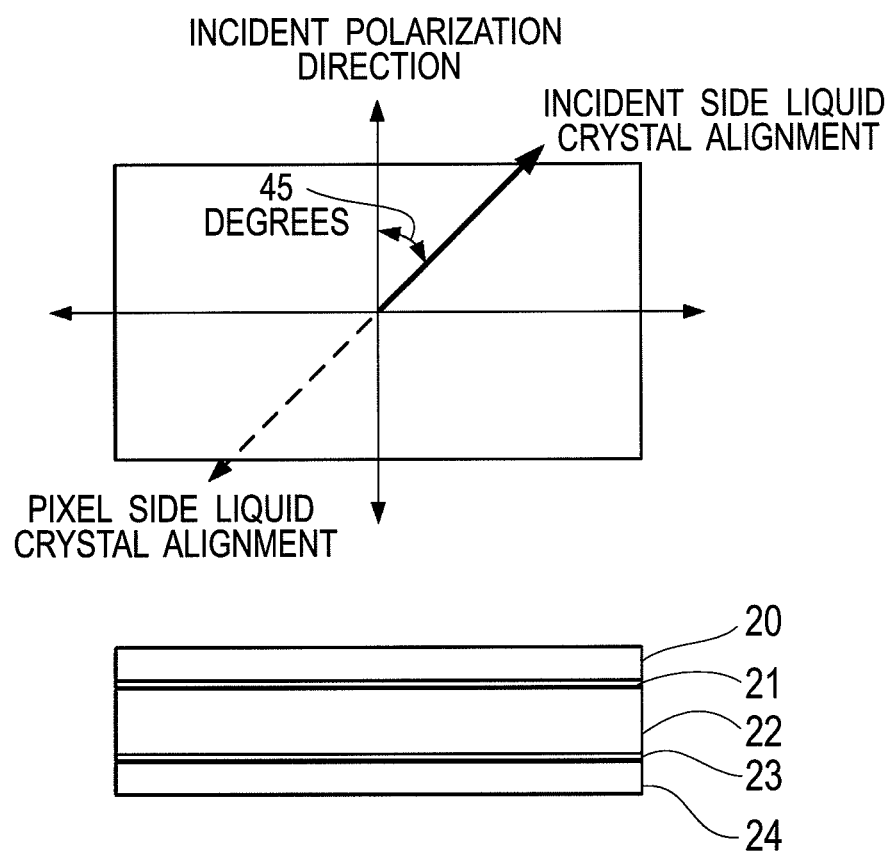
FIG. 3 is a diagram showing a structure of the liquid crystal on silicon 12.

FIG. 3 is a diagram showing a structure of the liquid crystal on silicon 12. The liquid crystal on silicon 12 is configured with a transparent substrate 20 having a transparent electrode formed on the surface thereof, and an active matrix substrate 24 on which a reflection electrode for each pixel is arranged in a matrix shape, which are disposed to be opposed to each other so as to cause the transparent electrode and the reflection electrode to face each other. The side of the transparent substrate 20 is the light incident side. Nematic liquid crystal (liquid crystal layer 22) having negative induced anisotropy is encapsulated between the transparent electrode and the reflection electrode in a state provided with a predetermined pretilt angle.

A cell gap of the liquid crystal on silicon 12 is 1.3 µm and an aspect ratio thereof is 16:9. Alignment films made of an SiOx compound 21 and 23 are provided for respective surfaces of the transparent substrate 20 and the active matrix substrate 24 on the side of the liquid crystal layer 22 by an evaporation surface processing method. The alignment direction defined by the alignment films made of the SiOx compound 23 for the liquid crystal on the active matrix substrate side (pixel side) and the alignment direction defined by the alignment film of the SiOx compound 21 for the liquid crystal on the transparent substrate side are different in approximately 180 degrees. Further, each of the alignment films is set to have an alignment direction of 45 degrees with respect to the incident side polarization direction. This type of liquid crystal on silicon 12 is called a "liquid crystal on silicon having a vertical alignment of an anti-parallel mode".

Returning to FIG. 2, the light reflected by the liquid crystal on silicon 12 is transmitted through the compensator 11 again and, after having been transmitted through the field lens 10, is reflected by the WG-PBS 9 and travels to the analyzer 13. A region between the field lens 10 and the liquid crystal on silicon 12 is designed to be a telecentric region. That is, the region between the field lens 10 and the liquid crystal on silicon 12 is a region in which the optical axis and the principal light ray are parallel to each other.

A region on the light source side of the field lens 10 is designed to be a non-telecentric region. The polarizer 8 and the WG-PBS 9 are provided in the non-telecentric region. In this region, the optical axis and the principal light ray are not parallel to each other. The region from the WG-PBS 9 to the cross dichroic prism 14 via the polarizer 13 is designed to be also a non-telecentric region. Principal light rays of the illumination light tend to converge in the direction from the field lens 10 toward the polarizer 8. Further, in the region where the light is output from the field lens 10 and reflected by the WG-PBS 9 to travel to the analyzer 13 and the cross dichroic prism 14, the principal light rays of the imaging light tends to converge in the direction from the field lens 10 toward the dichroic prism 14. Therefore, it is possible to cause each of the WG-PBS 9 and the cross dichroic prism to be downsized.

Figures 4, 5:
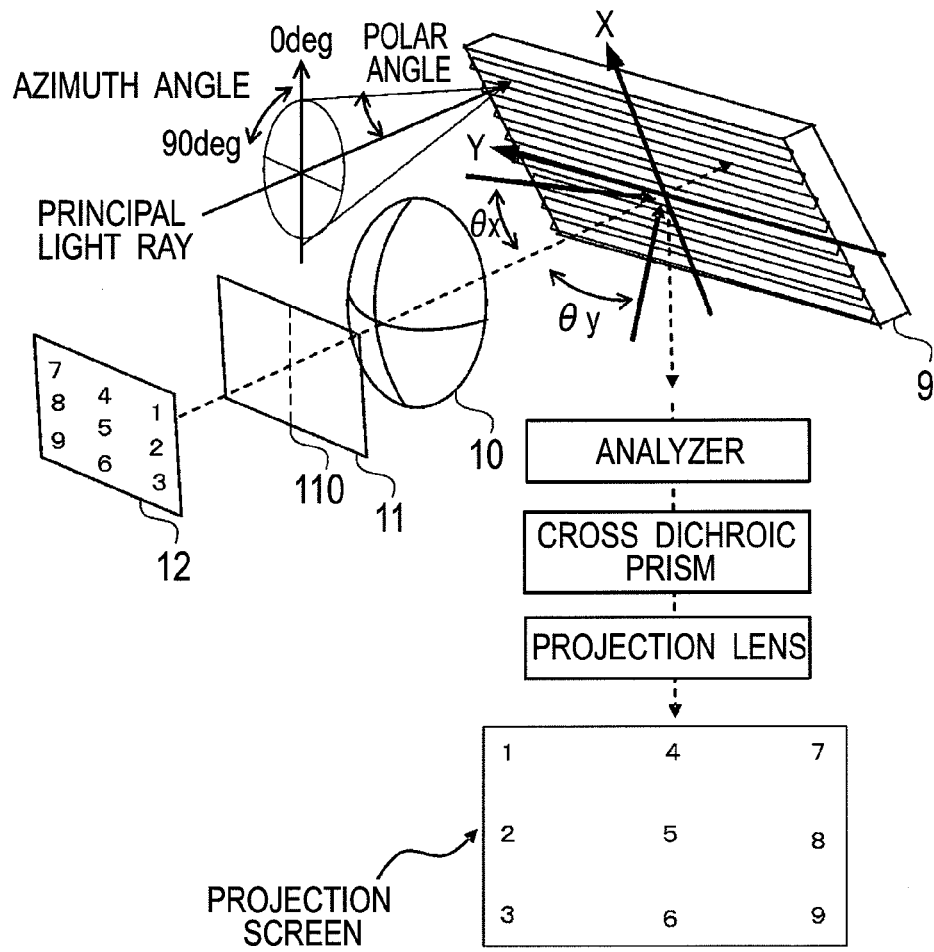
FIG. 4 is an explanatory diagram illustrating an incident angle when light reflected by the liquid crystal on silicon 12 is reflected by the WG-PBS 9 in the projection-type display apparatus according to the first embodiment.
FIG. 5 is a diagram showing angles (θx and θy) of a principal light ray and a maximum polar angle (maximum corn angle) when light corresponding to each of nine positions in the liquid crystal on silicon 12 enters into the WG-PBS 9.

FIG. 4 is an explanatory diagram illustrating an incident angle when the light reflected by the liquid crystal on silicon 12 is reflected by the WG-PBS 9 in the projection-type display apparatus according to the first embodiment. As shown in FIG. 3, x-y coordinate axes are defined on the WG-PBS 9. Then, the angle of the principal light ray of the incident light to the WG-PBS 9 is defined by angles θx and θy with respect to the optical axis. Further, as in FIG. 2, the liquid crystal on silicon 12 is provided with reference numerals 1 to 9. These reference numerals indicate positions of the display region in the liquid crystal on silicon 12. Reference numerals 1 to 4 and Reference numerals 6 to 9 indicate points in the outermost perimeter of the display region in the liquid crystal on silicon 12.

Due to the fact that the light source 1a in the illumination system has a light emission portion with a finite size, the light entering a certain position in the illumination system has a finite angle distribution. The light having a finite angle distribution is typically expressed to have a number of conical light fluxes centering the principal light ray. Accordingly, for the light entering the WG-PBS 9, a polar angle and an azimuth angle of a conical light flux around the principal light ray are defined as shown in FIG. 4. The polar angle expresses a degree of expansion of light and indicates that conical light expanded from the principal light ray with the polar angle exists. The polar angle is also called a corn angle.

FIG. 5 is a diagram showing an angle (θx, θy) of a principal light ray and a maximum polar angle when the light corresponding to each of the nine positions in the liquid crystal on silicon 12 enters into the WG-PBS 9. F number of the illumination optical system in the projection-type display apparatus according to the first embodiment is designed to be F2.0. The maximum polar angle is 13 degrees at all the nine points. In contrast, the angle (θx, θy) of the principal light ray entering the WG-PBS 9 is different depending on position difference on the liquid crystal on silicon 12. The principal light ray of the light rays focused onto the center of the liquid crystal on silicon 12 coincides with the optical axis and the incident angle of the principal light ray is provided as θx=0 and θy=0. The principal light ray of the light rays focused onto a point apart from the center of the liquid crystal on silicon 12 is not parallel to the optical axis. In other words, either one of θx and θy does not become zero.

Figure 6:
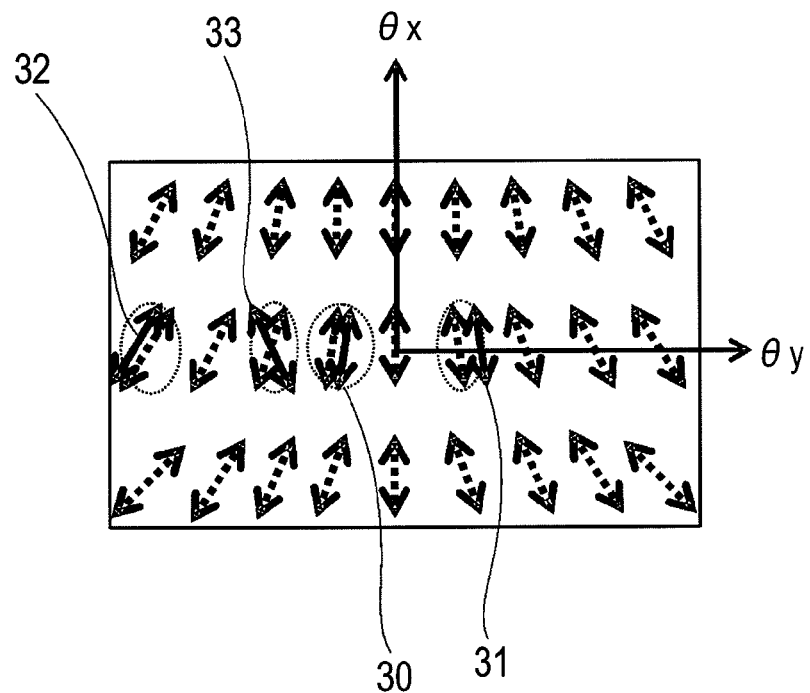
FIG. 6 is an explanatory diagram showing a polarization direction in which transmittance of incident light to the WG-PBS 9 becomes maximum, for the incident light entering the WG-PBS 9 in the angles (θx, and θy).

FIG. 6 is an explanatory diagram showing a polarization direction in which transmittance of the incident light to the WG-PBS 9 becomes maximum, for the incident light entering the WG-PBS 9 at an angle (θx, θy). FIG. 6 is a diagram viewed from the back side (polarizer 8 side) of the WG-PBS 9 in FIG. 4, and the arrows (broken lines) indicate polarization directions each in which transmittance of the incident light becomes maximum.

An origin in FIG. 6 indicates incident light entering the WG-PBS 9 at an angle of 45 degrees. The point in the plus θx direction from the origin indicates the incident light entering while being inclined in the θx direction in FIG. 4, and the incident angle to the WG-PBS 9 increases from 45 degrees. The point in the minus θx direction from the origin indicates the incident light entering while being inclined in −θx direction in FIG. 4, and the incident angle to the WG-PBS 9 decreases from 45 degrees.

For the incident light entering while being inclined in ±θx direction in FIG. 4, that is, the light on the θx axis in FIG. 6, the polarization direction in which the transmission of the incident light becomes maximum is the same as the polarization direction in which the transmittance of the incident light entering to the origin (θx=θy=0) of FIG. 6 becomes maximum. Then, the polarization directions of these incident light rays become parallel to the transmission axis direction of the WG-PBS 9.

On the other hand, in the case of the incident light entering while being inclined in the θy direction (θy≠0), the polarization direction in which the transmittance of the incident light becomes maximum is different from the polarization direction of the incident light entering into the origin (θx=θy=0), and is inclined in a certain angle. The reason is that, in the incident light entering while being inclined in the θy direction (θy≠0), the incident plane determined by the normal vector of the WG-PBS 9 and the incident light does not become parallel to the transmission axis direction of the WG-PBS 9. When θy changes, the inclined angle of polarization direction becomes smaller as θx becomes smaller and becomes larger as θx becomes larger.

Figure 7:
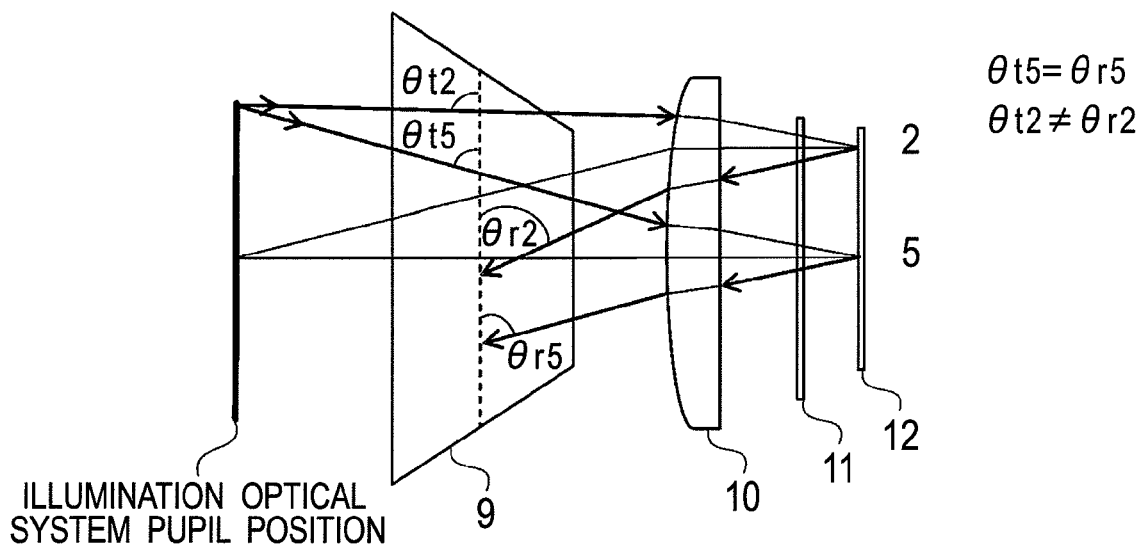
FIG. 7 is a diagram illustrating angles of light having a maximum polar angle entering into the WG-PBS 9 for light reflected at each of two points of numbers 5 and 2 on the liquid crystal on silicon 12.

FIG. 7 is a diagram illustrating an angle of the light ray which enters the WG-PBS 9 having a maximum polar angle, for the light reflected at each point of reference numerals 5 and 2 on the liquid crystal on silicon 12. The light ray which corresponds to the screen position 5 and has a maximum polar angle enters the WG-PBS 9 at an angle of θt5 and is reflected thereby at an angle of θr5, where θt5=θr5. In contrast, the light which corresponds to the screen position 2 and has a maximum polar angle enters the WG-PBS 9 at an angle of θt2 and is reflected thereby at an angle of θr2, where θt2 is not equal to θr2 apparently from FIG. 7. Therefore, the polarization when the light is reflected shifts from an optimum direction.

Returning to FIG. 6, there will be described the reason why a compensator having birefringence characteristics corresponding to the respective incident angles is needed in order to appropriately compensate all the screen positions 1 to 9.

FIG. 6 shows the polarization direction in transmission and the polarization direction in reflection by the arrows (solid lines), for each of the light rays which correspond to the screen positions 5 and 2 and have the maximum polar angles. For the light ray which corresponds to the screen position 5 and has the maximum polar angle, the polarization direction in transmission is indicated by reference numeral 30 and the polarization direction in reflection is indicated by reference numeral 31. For the light ray which corresponds to the screen position 2 and has the maximum polar angle, the polarization direction in transmission is indicated by reference numeral 32 and the polarization direction in reflection is indicated by reference numeral 33.

The transmission and reflection light rays which correspond to the screen position 5 with the maximum polar angle enter the WG-PBS 9 at the same angle. Then, the polarization immediately after the transmission through the WG-PBS 9 is reversed by the liquid crystal on silicon 12 in the up and down direction. As a result, the polarization when the light ray enters the WG-PBS 9 again coincides with the maximum transmission direction. On the other hand, in the light ray which corresponds to the screen position 2 and has the maximum polar angle, the polarization direction 32 in the transmission through the WG-PBS 9 is reversed by the liquid crystal on silicon 12 in the up and down direction to become the polarization direction 33 when the light ray enters the WG-PBS 9 again, and the polarization direction does not coincides with the maximum transmission direction (broken line arrow).

Here, it is assumed that the light ray which corresponds to the screen position 5 and has the maximum polar angle is transmitted through the WG-PBS 9 to have the P polarization and enters the liquid crystal on silicon 12 to be reflected with non-modulation (corresponds to a black screen). Since the P polarization when the light ray enters the WG-PBS 9 again coincides with the maximum transmission direction as described above, the P polarized light is not reflected toward the side of the projection lens 15 by transmitting through the WG-PBS 9 as it is. Therefore, a preferable black screen is obtained. That is, contrast is high.

On the other hand, it is assumed that the light ray which corresponds to the screen position 2 and has the maximum polar angle is transmitted through the WG-PBS 9 to have the P polarization and enters the liquid crystal on silicon 12 to be reflected with non-modulation (corresponds to a black screen). Since the P polarization when the light ray enters the WG-PBS 9 again does not coincide with the maximum transmission direction as described above, most of the P polarized light is transmitted through the WG-PBS 9 while a part thereof is reflected to the side of the projection lens 15. Therefore a preferable black screen is not obtained. That is, the contrast is low. Thus, when the P polarized light enters the liquid crystal on silicon 12 and is reflected with non-modulation, extent of the transmission through the WG-PBS 9 depends on the reflection position on the liquid crystal on silicon 12.

In this manner, since the light rays reflected at the screen positions 1 to 9 have respective different angles when entering into or being reflected from the WG-PBS 9, the light rays have respective different polarization states which maximize the reflection characteristic of the WG-PBS 9 when the light rays are reflected. Accordingly, in order to appropriately compensate all the screen positions 1 to 9, it is necessary to provide a compensator which has different characteristic depending on a position of the compensator.

Figure 8:
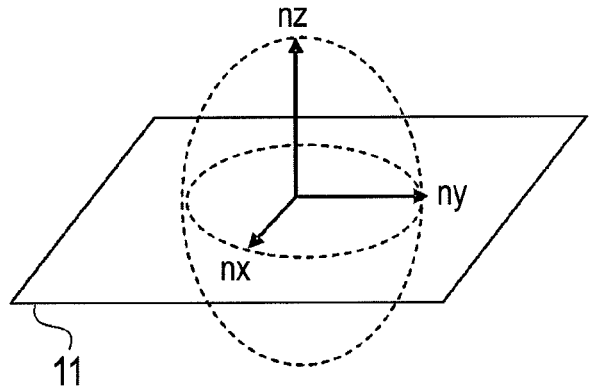
FIG. 8 is a diagram illustrating refractive index of the compensator.

Next, general explanation will be provided for a compensator. FIG. 8 is a diagram illustrating a refractive index of a compensator. Optical material can have up to three principal refractive indexes. Isotropic medium such as glass has a single refractive index. A compensator is configured with refractive material having some refractive indexes. A material having all of three refractive indexes is called a biaxial material. All the principal refractive indexes nx, ny, and nz shown in FIG. 8 are different from one another. Material having two equal principal refractive indexes is called uniaxial material. A uniaxial film having an optical axis in parallel to a plane 11 of FIG. 8 is generally called an A-plate. The two equal refractive indexes of the uniaxial material is called a normal refractive index (n0), that is, nx=nz=n0. The different refractive index of the uniaxial material is called an extraordinary refractive index (ne), that is, ny=ne.

In optical material, when principal refractive indexes nx and ny have different values, an axis having a higher refractive index is called a slow axis and an axis having a lower refractive index is called a fast axis. When the refractive index is high, the light traveling speed becomes slow and, when the refractive index is low, the light traveling speed becomes fast, and therefore the axis having a higher refractive index is called a slow axis. If nx>ny is assumed, the direction showing a value of nx is the slow axis. Meanwhile, a uniaxial film having an optical axis perpendicular to the plane 11 of FIG. 8 is generally called a C-plate. The refractive index of the C-plate is provided as nx=ny=n0 and nz=ne.

In the conventional optical system which has a telecentric region not only between the field lens 10 and the liquid crystal on silicon 12 but also in the region from the polarizer 8 to the field lens 10, and the region from the WG-PBS 9 to the analyzer 13, the compensator has the same characteristic without depending on a position thereof.

Figure 9:
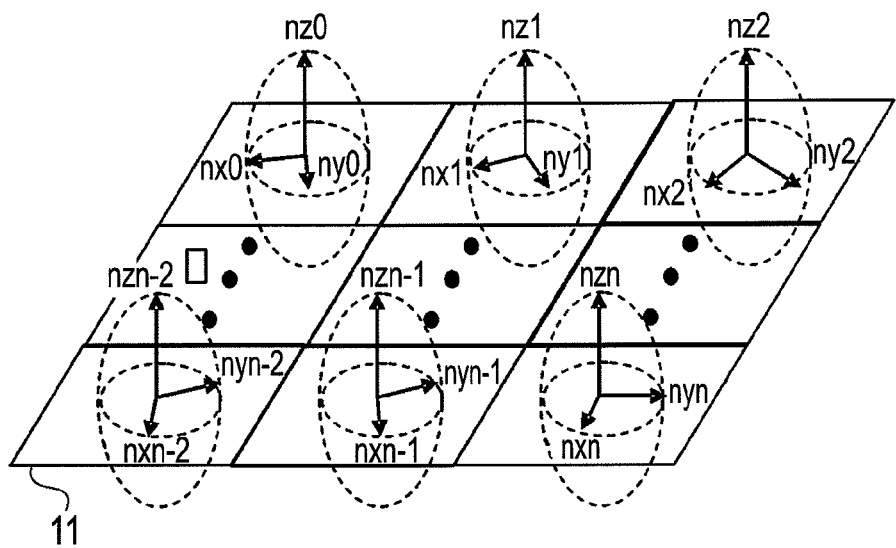
FIG. 9 is a schematic diagram illustrating the distribution-type compensator 11 in the first embodiment.

FIG. 9 is a schematic diagram illustrating the distribution-type compensator 11 in the first embodiment. In the first embodiment, the birefringent characteristic in the in-plane direction is changed depending on in-plane positions of the compensator 11 as shown in FIG. 9. In FIG. 9, the directions of nx and ny are changed depending on the positions of the compensator 11. For convenience of explanation, the distribution-type compensator 11 is divided into nine in-plane parts.

Figure 10:
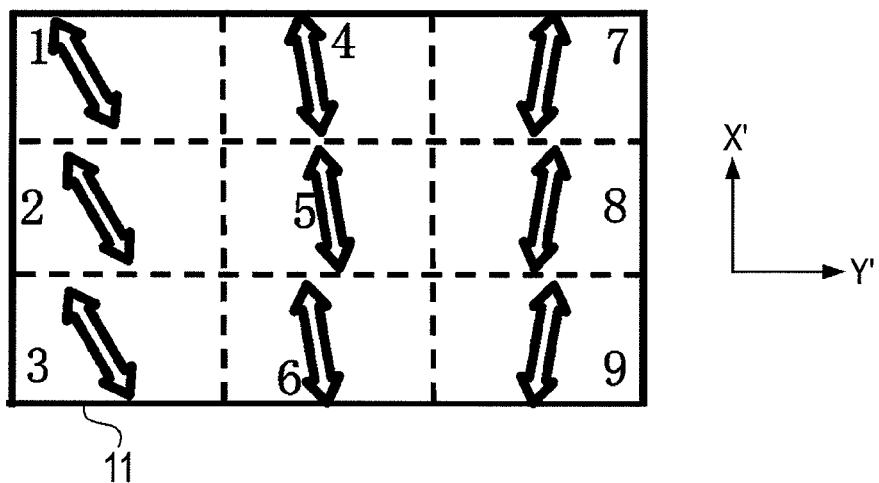
FIG. 10 is a diagram showing a slow axis direction of the distribution-type compensator 11 in the first embodiment.

FIG. 10 is a diagram showing a slow axis direction of the distribution-type compensator 11 in the first embodiment. FIG. 10 is a diagram when the distribution-type compensator 11 is viewed from the side of the field lens 10 in FIG. 2. The upper side of FIG. 10 (positive direction of the X' axis) is the side where the WG-PBS 9 comes closer to the liquid crystal on silicon 12 and the lower side of FIG. 10 (positive direction of the X' axis) is the side where the analyzer 13 is disposed. Reference numerals provided for the distribution-type compensator 11 of FIG. 10 correspond to reference numerals of the liquid crystal on silicon 12. Among reference numerals provided for the compensator, reference numerals 1 to 4 and 6 to 9 indicate the outermost perimeter of an effective region in the compensator. Further, the positions of reference numerals 4, 5, and 6 are located on a center line of the compensator 11 shown in FIG. 2 and FIG. 4.

Retardation (Δnd) in the XY in-plane direction is set to be 18 nm for the distribution-type compensator 11 of the first embodiment. Shifts in the slow axis direction are set to be 11 degrees at the positions 1, 2, and 3, shifts in the slow axis direction are set to be 3 degrees at the positions 4, 5, and 6, and shifts in the slow axis direction are set to be 5 degrees at the positions 7, 8, and 9. Then, the shift with 3 degrees at the positions 4, 5, and 6 is set only for performing retardance correction of the liquid crystal on silicon 12. Then, a retardance correction part of the liquid crystal on silicon 12 has a uniform value in each of the regions in the compensator, and therefore the retardance correction part of the liquid crystal on silicon 12 is added to the shift in the slow axis direction at the positions 1, 2, and 3. The retardance correction part of the liquid crystal on silicon 12 is subtracted from the shift in the slow axis direction at the positions 7, 8, and 9. From the above, an oblique light correction component caused by the non-telecentric illumination is 8 degrees.

In another expression, when the slow axis direction at the centerline is defined as a reference direction in the rectangular effective region of the distribution-type compensator 11, the angle of the slow axis direction is 8 degrees in average in the two sides parallel to the center line out of the four sides of the rectangle. In still another expression, the maximum value of the angle difference between the slow axis directions at any two positions in the effective region is 16 degrees.

Figure 11:
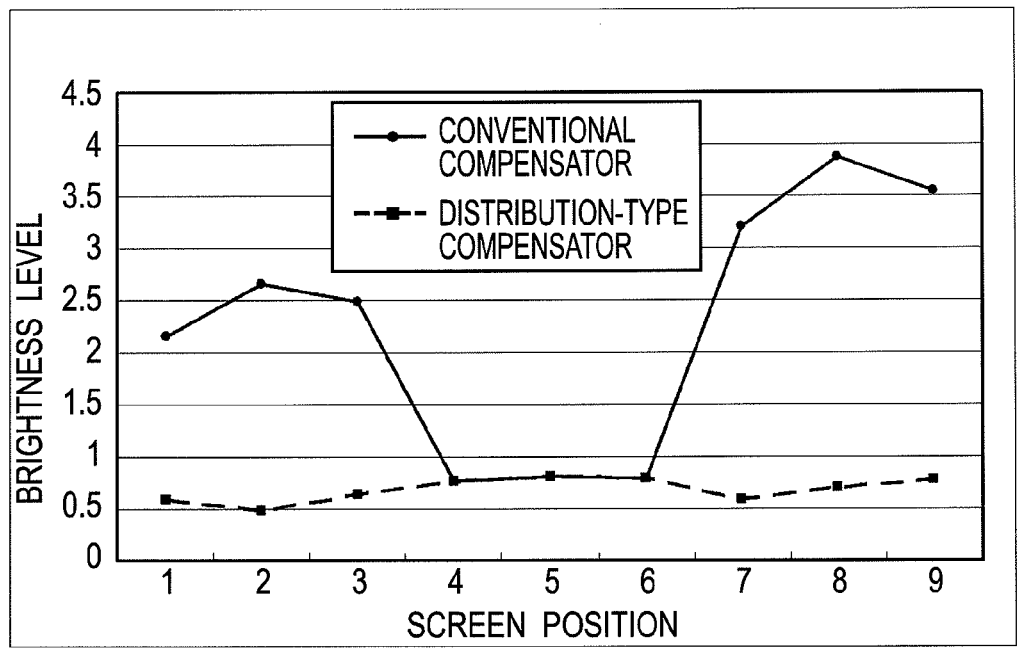
FIG. 11 is a diagram showing measurement results of black output brightness at nine points on a screen when a conventional compensator is arranged and when a distribution-type compensator 11 is arranged, in the first embodiment.

FIG. 11 is a diagram showing measurement results of black output brightness on the nine screen points when the conventional compensator is arranged and when the distribution-type compensator 11 is arranged, in the first embodiment. Compared to the conventional compensator, the distribution-type compensator 11 is found to improve in-plane brightness distribution greatly.

Figure 12:
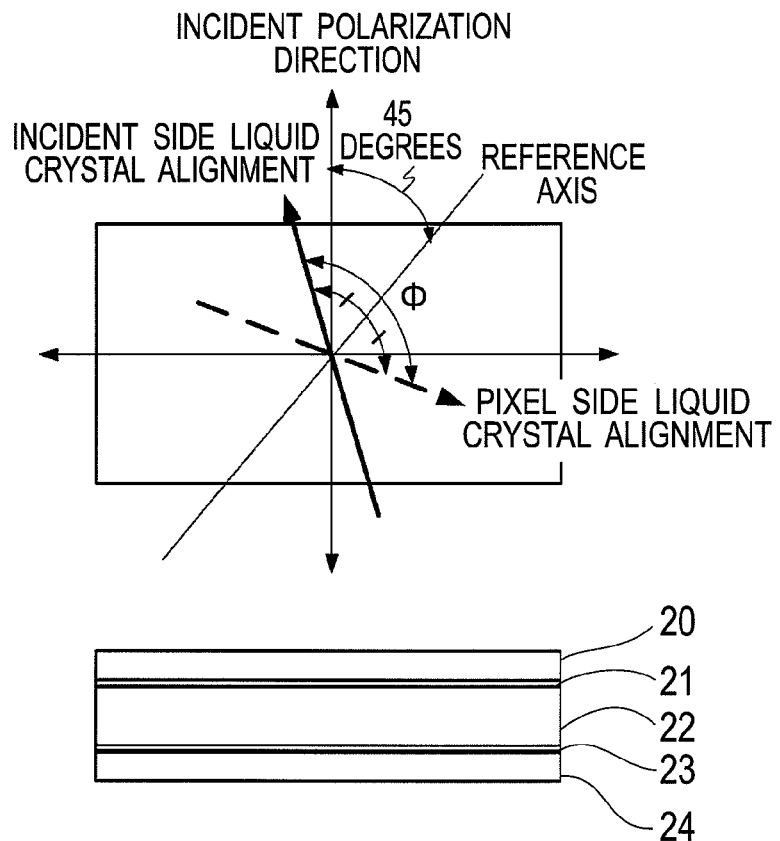
FIG. 12 is a diagram showing a liquid crystal on silicon 120 which is different from the liquid crystal on silicon 12 shown in FIG. 3.

FIG. 12 is a diagram showing a liquid crystal on silicon 120 which is a different type of the liquid crystal on silicon 12 shown in FIG. 3. The liquid crystal on silicon 120 is configures with a transparent substrate 20 having a transparent electrode formed on the surface thereof and an active matrix substrate 24 on which a reflection electrode and a drive circuit for each pixel is arranged in a matrix shape, which are disposed so as to be opposed to each other so as to cause the transparent electrode and the reflection electrode to face each other, and sandwiches nematic liquid crystal (liquid crystal layer 22) which has negative induced anisotropy in the gap between the two substrates. Alignment films 21 and 23 of a SiOx compound are provided for respective surfaces of the transparent substrate 20 and the active matrix substrate 24 on the side of the liquid crystal layer 22 by the evaporation surface processing method. The alignment direction defined by the alignment film 23 of the SiOx compound for the liquid crystal on the pixel side (active matrix substrate 24 side) and the alignment direction defined by the alignment film 21 of the SiOx compound for the liquid crystal on the incident side (alignment direction on the transparent substrate 20 side) are different by 120 degrees. The angle of the approximately 120 degrees is called a twist angle. A direction which is a direction between the alignment direction of the liquid crystal on the pixel side and the alignment direction of the liquid crystal on the incident side and has an equal angle from the alignment direction of the liquid crystal on the pixel side and the alignment direction of the liquid crystal on the incident side is called a reference axis. The reference axis is set to have an angle of 45 degrees with respect to the polarization direction of the incident light.

Figure 13:
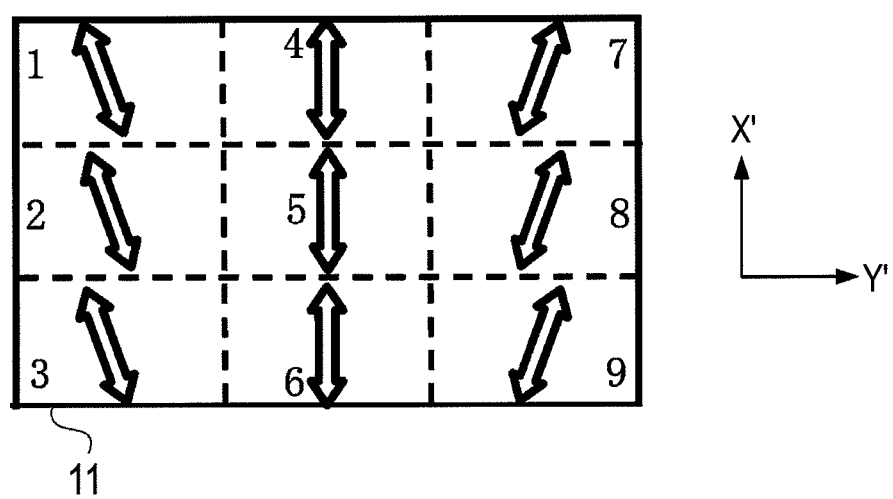
FIG. 13 shows a distribution-type compensator having a different slow axis direction for each in-plane region when a liquid crystal on silicon is a "liquid crystal on silicon 120 with a mode which has a twist angle of approximately 120 degrees and is different from an anti-parallel mode" in the first embodiment.

FIG. 13 shows a distribution-type compensator having slow axis directions which are different for respective in-plane regions when the liquid crystal on silicon is the "liquid crystal on silicon 120 with a mode which has a twist angle of an approximately 120 degrees and is different from the anti-parallel mode" in the first embodiment. FIG. 13 is a diagram when the compensator is viewed from the side of the field lens 10 in FIG. 2. The upper side of FIG. 13 (positive direction of the X' axis) is the side where the WG-PBS 9 comes closer to the liquid crystal on silicon 120 and the lower side of FIG. 13 (negative direction of the X' axis) is the side where the analyzer 13 is disposed. Reference numerals provided for the distribution-type compensator 11 of FIG. 13 correspond to reference numerals of the liquid crystal on silicon 120. Among reference numerals provided for the compensator, reference numerals 1 to 4 and 6 to 9 indicate the outermost perimeter of the effective region of the compensator.

The retardation (Δnd) in the XY in-plane direction is set to be 18 nm for the distribution-type compensator 11. Shifts in the slow axis direction are set to be 8 degrees at the positions 1, 2, and 3, shifts in the slow axis direction are set to be 0 degrees at the positions 4, 5, and 6, and shifts in the slow axis direction are set to be 8 degrees at the positions 7, 8, and 9. In the center row (i.e., corresponding to the positions 2, 5, and 8), the slow axis direction is not shifted from the X' axis. The reason why the slow axis direction is not shifted from the X' axis is that it is not necessary to correct the retardance of the liquid crystal on silicon 120 (in other words, to compensate an A component of the liquid crystal on silicon 120). Then, the alignments of the slow axes have axial symmetry around the X' axis. The maximum angle of the slow axis direction in the compensator is 8 degrees from the X' direction.

In another expression, when the center line direction is defined as a reference direction in the rectangular effective region of the distribution-type compensator 11, the angle of the slow axis direction is 8 degrees in the two sides parallel to the center line out of the four sides of the rectangle. In still another expression, the maximum value of the angle difference between the slow axis directions at any two positions in the effective region is 16 degrees.

Also when the liquid crystal on silicon is the liquid crystal on silicon 120 in the first embodiment, the in-plane brightness variation is improved greatly by the distribution-type compensator 11, similar to the case shown in FIG. 11.

While, in FIG. 10 and FIG. 13, the compensator is divided into nine parts for expressing the characteristic in consideration of explanation easiness, an actual compensator is fabricated by changing the slow axis direction smoothly (gradually). Further, while setting of a phase difference in the Z axis direction (C component) of the compensator is not related with the present invention, the phase difference in the Z axis direction can be changed optionally as needed according to the characteristic of the liquid crystal etc. so as to have a certain value in the plane.

Second Embodiment

FIG. 14 is a diagram showing parameters and characteristics of the distribution-type compensators in the first, second, and third embodiments. Geometrical arrangements are the same as that of the first embodiment shown in FIG. 1, FIG. 2, and FIG. 3. In the second embodiment, F number is set to be F1.5. The angle of the principal light ray is ±20 degrees at a screen position where the principal light ray has a maximum angle, and the maximum polar angle is 20 degrees.

When the liquid crystal on silicon 12 of the anti-parallel mode is used in the second embodiment, a distribution-type compensator having slow axis directions different for respective in-plane regions is obtained with a result similar to the case of FIG. 10.

The retardation (Δnd) in the XY in-plane direction is set to be 18 nm for the distribution-type compensator 11. Shifts in the slow axis direction are set to be 18 degrees at the positions 1, 2, and 3, shifts in the slow axis direction are set to be 3 degrees at the positions 4, 5, and 6, and shifts in the slow axis direction are set to be 12 degrees at the positions 7, 8, and 9. Then, the shift with 3 degrees at the positions 4, 5, and 6 is considered to be set only for performing the retardance correction of the liquid crystal on silicon 12. Then, the retardance correction part of the liquid crystal on silicon 12 has a uniform value in each of the regions in the compensator, and therefore the retardance correction part of the liquid crystal on silicon 12 is added to the shift in the slow axis direction at the positions 1, 2, and 3. The retardance correction part of the liquid crystal on silicon 12 is subtracted from the shift in the slow axis direction at the positions 7, 8, and 9. The oblique light correction component caused by the non-telecentric illumination is 15 degrees.

In another expression, when the slow axis direction at the centerline is defined as a reference direction in the rectangular effective region of the distribution-type compensator 11, the angle of the slow axis direction is 15 degrees in average in the two sides parallel to the center line out of the four sides of the rectangle. In still another expression, the maximum value of the angle difference between the slow axis directions at any two positions in the effective region is 30 degrees.

When the liquid crystal on silicon 120 using a mode which has a twist angle of approximately 120 degrees and is different from the anti-parallel mode is used in the second embodiment, a distribution-type compensator having the slow axis directions different for respective in-plane regions is obtained with a result similar to the case of FIG. 13.

The retardation (Δnd) in the XY in-plane direction is set to be 18 nm for the distribution-type compensator 11. Shifts in the slow axis direction are set to be 15 degrees at the positions 1, 2, and 3, shifts in the slow axis direction are set to be 0 degrees at the positions 4, 5, and 6, and shifts in the slow axis direction are set to be 15 degrees at the positions 7, 8, and 9. In the center row (i.e., corresponding to the positions 2, 5, and 8), the slow axis direction is not shifted from the X' axis. The reason why the slow axis direction is not shifted from the X' axis is that it is not necessary to correct the retardance of the liquid crystal on silicon 120 (in other words, to compensate the A component of the liquid crystal on silicon 120). Then, the alignments of the slow axes have axial symmetry around the X' axis. The maximum angle of the slow axis direction in the compensator is 15 degrees from the X' direction.

In another expression, when the center line direction is defined as a reference direction in the rectangular effective region of the distribution-type compensator 11, the angle of the slow axis direction is 15 degrees in the two sides parallel to the center line out of the four sides of the rectangle. In still another expression, the maximum value of the angle difference between the slow axis directions at any two positions in the effective region is 30 degrees.

Also when the liquid crystal on silicon is the liquid crystal on silicon 12 or the liquid crystal on silicon 120 in the second embodiment, the in-plane brightness variation is improved greatly by the distribution-type compensator similarly to the case of FIG. 11.

Third Embodiment

FIG. 14 also shows various parameters in a third embodiment. A geometrical arrangement is the same as that of the first embodiment shown in FIG. 1, FIG. 2, and FIG. 3. F number is set to F3.5. The angle of the principal light ray is ±3 degrees at a screen position where the principal light ray has a maximum angle, and the maximum polar angle is 8.2 degrees.

When the liquid crystal on silicon 12 of the anti-parallel mode is used in the third embodiment, a distribution-type compensator having the slow axis directions different for respective in-plane regions is obtained with a result similar to the case of FIG. 10.

The retardation (Δnd) in the XY in-plane direction is set to be 18 nm for the distribution-type compensator 11. Shifts in the slow axis direction are set to be 8 degrees at the positions 1, 2, and 3, shifts in the slow axis direction are set to be 3 degrees at the positions 4, 5, and 6, and shifts in the slow axis direction are set to be 3 degrees at the positions 7, 8, and 9. Then, the shift with 3 degrees at the positions 4, 5, and 6 is considered to be set only for performing the retardance correction of the liquid crystal on silicon 12. Then, the retardance correction part of the liquid crystal on silicon 12 has a uniform value in each of the regions in the compensator, and therefore the retardance correction part of the liquid crystal on silicon 12 is added to the shift in the slow axis direction at the positions 1, 2, and 3. The retardance correction part of the liquid crystal on silicon 12 is subtracted from the shift in the slow axis direction at the positions 7, 8, and 9. The oblique light correction component caused by the non-telecentric illumination is 5 degrees.

In another expression, when the slow axis direction at the centerline is defined as a reference direction in the rectangular effective region of the distribution-type compensator 11, the angle of the slow axis direction is 5 degrees in average in the two sides parallel to the center line out of the four sides of the rectangle. In still another expression, the maximum value of the angle difference between the slow axis directions at any two positions in the effective region is 10 degrees.

When the liquid crystal on silicon 120 using a mode which has a twist angle of approximately 120 degrees and is different from the anti-parallel mode is used in the third embodiment, a distribution-type compensator having the slow axis directions different for respective in-plane regions is obtained with a result similar to the case of FIG. 13.

The retardation (Δnd) in the XY in-plane direction is set to be 18 nm for the distribution-type compensator 11. Shifts in the slow axis direction are set to be 5 degrees at the positions 1, 2, and 3, shifts in the slow axis direction are set to be 0 degrees at the positions 4, 5, and 6, and shifts in the slow axis direction are set to be 5 degrees at the positions 7, 8, and 9. In the center row (i.e., corresponding to the positions 2, 5, and 8), the slow axis direction is not shifted from the X' axis. The reason why the slow axis direction is not shifted from the X' axis is that it is not necessary to correct the retardance of the liquid crystal on silicon 120 (in other words, to compensate the A component of the liquid crystal on silicon 120). Then, the alignments of the slow axes have axial symmetry around the X' axis. The maximum angle of the slow axis direction in the compensator is 5 degrees from the X' direction.

In another expression, when the center line direction is defined as a reference direction in the rectangular effective region of the distribution-type compensator 11, the angle of the slow axis direction is 5 degrees in average in the two sides parallel to the center line out of the four sides of the rectangle. In still another expression, the maximum value of the angle difference between the slow axis directions at any two positions in the effective region is 10 degrees.

Also when the liquid crystal on silicon is the liquid crystal on silicon 12 or the liquid crystal on silicon 120 in the third embodiment, the in-plane brightness variation is improved greatly by the distribution-type compensator, similar to the case of FIG. 11.

Summarizing the above, when F number is set to 3.5 to 1.5, it is effective to use a distribution-type compensator in an optical system in which a field lens is disposed between a liquid crystal on silicon and a WG-PBS. Then, when the retardation (Δnd) in the XY in-plane direction is set to be 18 nm for the distribution-type compensator 11, the oblique light correction component in the non-telecentric region is set to be "5 to 15 degrees in the slow axis shift". When the retardation (Δnd) in the XY in-plane direction is set to be a value extremely smaller than 18 nm (e.g., 5 nm) for the distribution-type compensator 11, it is necessary to set the slow axis angle to be large. When the retardation (Δnd) in the XY in-plane direction is set to be a value extremely larger than 18 nm for the distribution-type compensator 11, the slow axis shift becomes too small and would be easily affected by fabrication error.

While the retardation (Δnd) in the XY in-plane direction is set to be 18 nm for the distribution-type compensator 11 in each of the first to third embodiments, the retardation may have a value in a range of 18±5 nm. Further, while each of the first to third embodiments is explained for the case of using the WG-PBS, a polarization beam splitter with a type in which a thin film is sandwiched between optical glass plates may be used. Further, while each of the first to third embodiments uses an integrator illumination optical system as the illumination optical system, a different illumination optical system may be used, such as an illumination optical system using a rod integrator, for example. Moreover, while the explanation is the case of the three-plate type optical system using the three liquid crystals on silicon, a single plate optical system using one liquid crystal on silicon can be applied similarly.

Among the conventional compensators, the A-plate can be fabricated using a stretched polymer film such as polyvinyl alcohol and polycarbonate. The C-plate can be fabricated using uniaxially-compressed polymer or molded cellulose acetate, for example. In the present embodiments, the compensator includes a substrate, an alignment film, and liquid crystal polymer. First, the alignment film is coated on the substrate and irradiated with UV light. Since the alignment direction of the alignment film is changed by a polarization state of the UV light, the alignment film is irradiated with the UV light having a polarization state which is changed for each position so as to obtain a desired alignment direction. Next, the liquid crystal polymer is coated on the cured alignment film and further irradiated with the UV light for curing. The liquid crystal polymer is aligned according to the alignment film and a compensator having a characteristic different for each position can be obtained. The compensator using the liquid crystal polymer can be fabricated by the above fabrication method.

What is claimed is:

1. A distribution-type compensator provided to a liquid crystal display apparatus in which a field lens is disposed between a reflection-type liquid crystal element and a polarization beam splitter, the distribution-type compensator is disposed between the field lens and the reflection-type liquid crystal element wherein,
    a slow axis direction is changed so as to provide an oblique light correction component for a non-telecentric region,
    in-plane retardation is 18 nm±5 nm in a rectangular effective region with a long side and a short side,
    a slow axis direction changes discretely or continuously in a plane of the effective region according to a polarization direction in which transmittance of incident light to the polarization beam splitter becomes a maximum transmittance, and
    an angle difference between slow axis directions at any two points in the effective region has a maximum value in a range of 10 degrees to 30 degrees.

2. A liquid crystal display apparatus comprising:
    a light source;
    an illumination optical system that illuminates a reflection-type liquid crystal element with light emitted from the light source;
    a polarization beam splitter that transmits polarized light of incident light and detects modulated light which has been modulated by the reflection-type liquid crystal element;
    a field lens that converts light from the polarization beam splitter into telecentric illumination light;
    the distribution-type compensator according to claim 1;
    the reflection-type liquid crystal element that modulates light which has been transmitted through the distribution-type compensator; and
    a projection lens that projects modulated light from the reflection-type liquid crystal element.

3. The liquid crystal display apparatus according to claim 2, wherein the polarization beam splitter is a wire grid type polarization beam splitter.

* * * * *